United States Patent

Nakano

[11] Patent Number: 5,772,941
[45] Date of Patent: Jun. 30, 1998

[54] POLYVINYL CHLORIDE RESIN SHEETS AND PRODUCTION THEREOF

[75] Inventor: Reikichi Nakano, Kobe, Japan

[73] Assignee: Bando Chemical Industries, Ltd., Kobe, Japan

[21] Appl. No.: 616,067

[22] Filed: Mar. 14, 1996

[30] Foreign Application Priority Data

Mar. 16, 1995 [JP] Japan .................................. 7-057723

[51] Int. Cl.$^6$ ................................................... B29C 43/24
[52] U.S. Cl. ...................... 264/175; 264/284; 264/288.4
[58] Field of Search .................................. 264/175, 284, 264/288.4, 210.2

[56] References Cited

U.S. PATENT DOCUMENTS

| | | | |
|---|---|---|---|
| 3,007,207 | 11/1961 | Salhofer | 264/175 |
| 3,594,265 | 7/1971 | Wicker et al. | 264/175 |
| 4,311,658 | 1/1982 | Nicoll | 264/175 |
| 4,402,887 | 9/1983 | Kuriyama et al. | 264/175 |
| 4,454,294 | 6/1984 | Zentner et al. | 264/175 |
| 4,461,797 | 7/1984 | Adachi et al. | 428/147 |
| 4,774,936 | 10/1988 | Bittner, Jr. | 264/175 |
| 4,938,905 | 7/1990 | Diamaru | 264/288.4 |
| 5,132,157 | 7/1992 | Asanuma et al. | 264/284 |
| 5,348,794 | 9/1994 | Takahashi et al. | 264/288.4 |

OTHER PUBLICATIONS

Hull, Derek, "An Introduction to Composite Materials", Cambridge University Press, New York pp. 17 and 66, 1990.

Primary Examiner—Jan H. Silbaugh
Assistant Examiner—Mark Eashoo
Attorney, Agent, or Firm—Merchant, Gould, Smith, Edell, Welter & Schmidt

[57] ABSTRACT

A polyvinyl chloride resin sheet which is excellent in resistance to scratch, wear and slip and hence suitable for use as flooring materials, which has a thickness of 50–500 μm; an embossed and matted surface of which roughness is 15–25 μm; and a transmittance of not less than 75%, and which comprises: (a) polyvinyl chloride; (b) a plasticizer in an amount of 5–35 parts by weight per 100 parts by weight of polyvinyl chloride; and (c) short glass fibers having a diameter of 6–12 μm and an average length of 0.2–1.0 mm in an amount of 0.5–30 parts by weight per 100 parts by weight of polyvinyl chloride. The resin sheet can be produced by calendering a composition containing components (a) and (b) along with glass fibers (c) having an average length of 2–12 mm. The calendered sheet is treated with an embossing roll whose peripheral velocity is 1.3–2.3 times that of the final calender roll.

5 Claims, 1 Drawing Sheet

POLYVINYL CHLORIDE RESIN SHEETS AND PRODUCTION THEREOF

FIELD OF THE INVENTION

This invention relates to polyvinyl chloride resin sheets and production thereof. More particularly, the invention relates to a substantially transparent and short glass fibers containing polyvinyl chloride resin sheet especially suitable for use as flooring materials on account of its excellent resistance to scratch, wear and slip.

DESCRIPTION OF THE PRIOR ART

A variety of resin sheets containing fillers such as glass fibers are already known and they are in wide use for a variety of purposes. For example, a decorative laminate is disclosed in Japanese Utility Model Publication No. 60-33005 which has an intermediate layer of a resin in which short glass fibers are dispersed together with a colorant interposed between a translucent or opaque base layer and a transparent or translucent surface layer of a resin and which has a pattern or design between the intermediate layer and the surface layer. Such a decorative laminate is elaborately designed and hence useful for decorative purposes. However, such a decorative laminate has a surface layer which is not sufficient in resistance to scratch, wear or slip so that it is not usable as flooring materials.

A protecting sheet is disclosed in Japanese Patent Application Laid-Open No. 56-69158, which is composed of a plasticized or semi-rigid polyvinyl chloride resin sheet in which fine particles of inorganic fillers such as silica or zeolite are dispersed and has an adhesive layer on either or both sides of the sheet. This sheet has improved resistance to slip to an extent, however, the sheet is also not sufficient in resistance to scratch or wear, and moreover, it is poor in transparency. A further decorative laminate for interior use is also disclosed in Japanese Patent Application Laid-Open No. 6-79835, which is composed of a resin film in which short glass fibers are dispersed, an internally plasticized film and an adhesive layer, in this order. However, no attention is paid to resistance to slip, which is an essential feature of flooring materials.

SUMMARY OF THE INVENTION

It is an object of the invention to provide a substantially transparent polyvinyl chloride resin sheet which contains short glass fibers and is especially suitable for use as flooring materials on account of its excellent resistance to scratch, wear and slip.

It is also an object of the Invention to provide a method for producing such a polyvinyl chloride resin sheet.

The invention provides a transparent polyvinyl chloride resin sheet which has a thickness of 50–500 $\mu$m; an embossed and matted surface of surface roughness of 15–25 $\mu$m; and a transmittance of not less than 75%, and which comprises;
 (a) polyvinyl chloride;
 (b) a plasticizer in an amount of 5–35 parts by weight per 100 parts by weight of polyvinyl chloride; and
 (c) short glass fibers having a diameter of 6–12 $\mu$m and an average length of 0.2–1.0 mm in an amount of 0.5–30 parts by weight per 100 parts by weight of polyvinyl chloride.

The invention further provides a method for producing a polyvinyl chloride resin sheet which has a thickness of 50–500 $\mu$m; an embossed and matted surface of which roughness is 15–25 $\mu$m; and a transmittance of not less than 75%, which comprises:
 preparing a composition comprising
  (a) polyvinyl chloride;
  (b) a plasticizer in an amount of 5–35 parts by weight per 100 parts by weight of polyvinyl chloride; and
  (c) short glass fibers having a diameter of 6–12 $\mu$m and an average length of 2–12 mm in an amount of 0.5–30 parts by weight per 100 parts by weight of polyvinyl chloride;
 calendering the compound into a resin sheet with calender rolls; and in succession,
embossing the surface of the resin sheet by use of an embossing machine composed of an embossing roll and a backup roll with a ratio of the peripheral velocity of the embossing roll to the peripheral velocity of the final roll of the calender rolls being in the range of 1.3–2.3.

DESCRIPTION OF PREFERRED EMBODIMENTS

Figure 1:
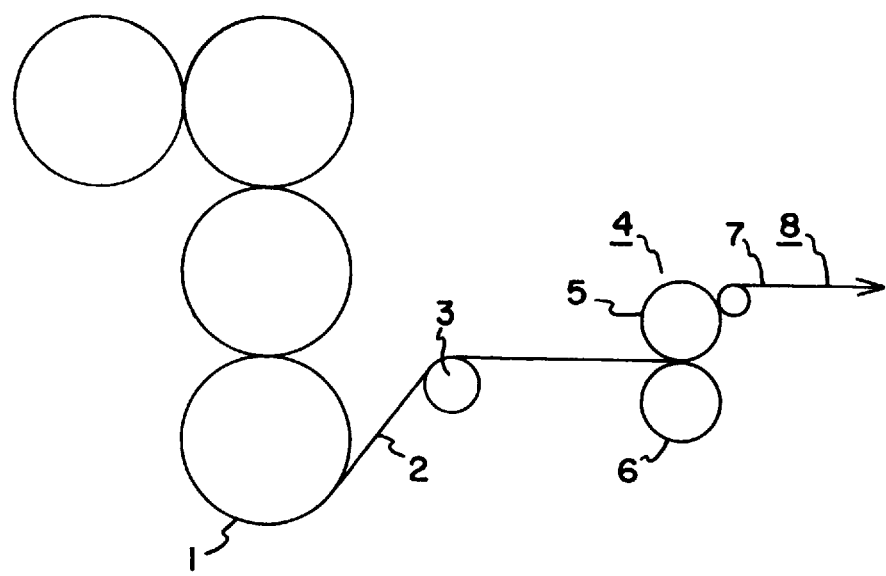
FIG. 1 is an example of the arrangement of a calender machine and an embossing machine for the production of a resin sheet of the invention.

Any polyvinyl chloride which is known to be usable for calendering may be used. Polyvinyl chloride say be used alone or it may be blended with a second resin to improve the processability or properties of polyvinyl chloride. The second resin may be exemplified by, for example, ethylene-vinyl chloride copolymers, ethylene-vinyl acetate copolymers, ethylene-vinylidene chloride copolymers, vinyl chloride-(meth)acrylic ester copolymers, vinyl chloride grafted polyurethane copolymers or methyl methacrylate (copolymer) resins. The second resin may be used up to 10% by weight in the resultant blend. In particular, methyl methacrylate (copolymer) resin is useful as a modifier for polyvinyl chloride.

The polyvinyl chloride or its blend as above mentioned is kneaded with a plasticizer and short glass fibers among others to prepare a uniform mixture, i.e., a compound, and the compound is then calendered to provide polyvinyl chloride resin sheets.

The plasticizer may be any one which is known to be usable for calendering products of polyvinyl chloride resin. For example, the plasticizer used includes, phthalic acid diesters such as diethylhexyl phthalate (DOP), linear dibasic carboxylic acid diesters, phosphoric acid esters, epoxylated soybean oil or polyester plasticizers. Depending upon the requisites of the resultant resin sheets, the plasticizer is used usually in an amount of 5–35 parts by weight, preferably in an amount of 10–30 parts by weight, per 100 parts by weight of polyvinyl chloride used.

The short glass fibers used in the invention have a diameter of 6–12 $\mu$m and an average length of 2–12 mm and are used in an amount of 0.5–30 parts by weight, preferably in an amount of 1–25 parts by weight, most preferably in an amount of 3–20 parts by weight, per 100 parts by weight of polyvinyl chloride so that the resultant resin sheet has a surface roughness in the desired range after slight embossing to form a matted surface.

As the short glass fibers, chopped glass strands are especially useful in the preparation of the resin sheet of the invention. The chopped glass strand are commercially available. They may be produced by sizing glass filaments with a sizing agent, preferably a silane coupling agent, gathering about 200 to 300 filaments into bundles of filaments, and cutting the bundle to a length of usually about 0.6–60 mm. In the production of the resin sheet of the invention, the glass strand is mixed and kneaded with polyvinyl chloride so that it is separated into individual short fibers and dispersed as such in the polyvinyl chloride.

When the amount of the short glass fibers used is less than 0.5 parts by weight per 100 parts by weight of polyvinyl chloride, the resultant resin sheet is still deficient in resistance to scratch, wear and slip. On the other hand, when the amount is more than 30 parts by weight per 100 parts by weight of polyvinyl chloride, the resultant compound is difficult to calender, and besides, the resultant sheet is deficient in transparency.

The composition usually contains a stabilizer, preferably metallic soap such as barium or zinc soap. The stabilizer is used usually in an amount of 0.5–10 parts by weight, preferably in amount of 1–5 parts by weight, per 100 parts by weight of polyvinyl chloride.

Other additives may be contained in the composition if necessary in such an amount that the incorporation thereof into the compound does not adversely affect the transparency or other desired properties of the resultant resin sheet. The additive May include, for example, lubricants, antioxidants, ultraviolet absorbers, fire retardants or antistatic agents.

The short glass fibers may be mixed and kneaded under heating together with a small amount of polyvinyl chloride or plasticizer to prepare a batch, and the batch may be used in the preparation of the compound. The use of a batch makes it easy to disperse the short glass fibers evenly in the composition. The use of a batch is also advantageous from the standpoint of environmental protection since short glass fibers are not scattered during the preparation of the composition. By way of example, the batch is composed of 60–80% by weight of short glass fibers, 5–20% by weight of polyvinyl chloride and 10–35% by weight of plasticizer.

As is well known in the art, the composition is prepared by metering and mixing the ingredients as mentioned above together, kneading and plasticizing the mixture to form a compound, feeding the compound into a bank between the calender rolls, and calendering the compound to a resin sheet. The thus obtained resin sheet is then in succession supplied to an embossing machine to emboss slightly the surface of the resin sheet to form a matted sheet whereby the sheet has a desired surface roughness in the range of 15–25 $\mu$m according to the invention.

The calender machine used In the invention is not specifically limited, however, an inverted L-type four rolls calender is preferred, as illustrated In FIG. 1. According to the invention, the resin sheet 2 is taken out of the final roll 1 of the calender rolls and the sheet is then in succession supplied to an embossing machine 4 composed of an embossing roll 5 and a backup roll 6 via a take off roll 3, after heating if necessary, to provide polyvinyl chloride resin sheets having a thickness of 50–500 $\mu$m. The embossing machine 4 Is mounted to emboss the resin sheet slightly so that the resin sheet has a desired matted surface.

The embossing roll has a metallic surface, such as of stainless steel. It is preferred that the embossing roll has a roughness of 3–6 $\mu$m to form a matted surface of a roughness in the range of 15–25 $\mu$m, preferably in the range of 17–23 $\mu$m, most preferably in the range of 17.5–21 $\mu$m, on the resin sheet by embossing the resin sheet slightly while applying tension to the resin sheet in the lengthwise direction according to the invention as set forth hereinafter. The backup roll has usually a surface of rubber and has a roughness of 7–13 $\mu$m.

The resin sheet 2 is supplied to a gap between the embossing roll 5 and the backup roll 6 and is embossed on the surface. It is essential that the resin sheet 2 is take off from the final calender roll 1 and is supplied to the embossing roll with a ratio of the peripheral velocity of the embossing roll to the peripheral velocity of the final roll of the calender rolls being in the range of 1.3–2.3 so that the resin sheet is stretched in the lengthwise direction, thereby providing a polyvinyl chloride resin sheet 8 which has a thickness of 50–500 $\mu$m, an embossed and matted surface 7 whose surface roughness is in the range of 15–25 $\mu$m and a light transmittance of not less than 75%, wherein the surface roughness is expressed in terms of ten point average roughness (RzD). It is most preferred that the ratio of the peripheral velocity of the embossing roll to the peripheral velocity of the final roll of the calender is in the range of 1.5–2.1. The backup roll is driven at the same Peripheral velocity as the embossing roll.

In a preferred embodiment, the calender machine is so operated that the final roll 1 has a peripheral velocity of 10–25 m per minute, and the embossing machine is so operated as above mentioned so that tension is applied to the resin sheet in the lengthwise direction, that is, the resin sheet is stretched in the lengthwise direction to reduce the thickness, thereby providing a resin sheet which contains short glass fibers having an average length of 0.2–1.0 mm in an amount of 0.5–30 parts by weight, preferably 1–25 parts by weight, most preferably 3–20 parts by weight, per 100 parts by weight of Polyvinyl chloride, and has a thickness of 50–500 $\mu$m, preferably 80–300 $\mu$m, As consequences, the resin sheet has an embossed and matted surface whose roughness is in the range of 15–25 $\mu$m, preferably 17–23 $\mu$m, most preferably 17.5–21 $\mu$m, and thus has an excellent resistance to slip in terms of a coefficient of static friction as defined in ASTM D 2047 of not less than 0.5.

According to the invention, in spite of the fact that an embossing roll having a surface roughness of 3–6 $\mu$m is used to emboss the resin sheet slightly, there is obtained a resin sheet which has an enlarged surface roughness in the range of 15–25 $\mu$m.

This is a first important aspect of the invention. A probable reason therefor is that the resin sheet is taken up from the final calender roll to the embossing roll while tension is applied to the resin sheet in the longwise direction, and accordingly while the resin sheet is stretched in the longwise direction, the resin sheet is embossed, so that the surface of the sheet subsides at portions where no glass fibers are present to enlarge the surface roughness.

As a second important aspect, the resultant resin sheet has short glass fibers evenly dispersed therein from the surface or front to the back side so that the resin sheet is excellent in resistance to scratch and wear. Even if the resin sheet is worn at the surface to some extent, it still retains a high resistance to slip.

As a further important aspect, the resin sheet of the invention has a light transmittance of not less than 75%, preferably not less than 80%, that is, the resin sheet is substantially transparent. Accordingly, a pattern or a design, can be seen clearly through the resin sheet so that it is suitable for use as decorative flooring materials.

The invention will be described with reference to examples, however, the invention is not limited thereto.

EXAMPLE 1

A mixture of 200 parts by weight of chopped glass strands of short glass fibers having a diameter of 6 $\mu$m and a length of 8 mm (Glasslon Chopped Strand 06-IE-830A available from Asabi Fiber Class K.K.), 22.0 parts by weight of polyvinyl chloride having an average Polymerization degree of 700, 63.0 parts by weight of diethylhexyl phthalate and 0.7 parts by weight of epoxylated soybean oil was kneaded together under heating with a Henschel mixer to prepare a batch containing 70% by weight of short glass fibers.

Polyvinyl chloride having an average polymerization degree of 1050, diethylhexyl phthalate, barium-zinc stabilizer, epoxylated soybean oil and a modifier were each metered and kneaded together with the glass fiber batch by use of a Henschel mixer to prepare a composition composed of 24 parts by weight of diethylhexyl phthalate, 2.5 parts by weight of barium-zinc stabilizer, 3.0 parts by weight of epoxylated soybean oil, 1.5 parts by weight of modifier and 3.0 parts by weight of short glass fibers each per 100 parts by weight of polyvinyl chloride.

The composition was supplied to a bank of an inverted L-type calender as illustrated in FIG. 1 and formed into a resin sheet having a thickness of 200 μm with a peripheral velocity of the final calender roll of 15 m per minute and a peripheral velocity of the embossing roll of 22.5 m per minute, i,e., at a ratio of the peripheral velocity of the embossing roll to the peripheral velocity of the final calender roll of 1.5. The embossing roll had a surface roughness of 4.5 μm and the backup roll had a surface roughness of 10.5 μm.

The resin sheet was found to contain short glass fibers having an average length of 0.51 mm, and had an embossed and matted surface whose roughness was 19.5 μm and the back side of which roughness was 16.1 μm. The resistance to scratch, wear and slip for the resin sheet are shown in Table 1.

The resistance to scratch was examined by a pencil scratch test according to JIS K 5400; the resistance to wear was examined by a Taber's abrasion resistance test with CS-17 abrasive wheels under a load of 1 kg according to JIS K 7204; the resistance to slip was examined In terms of a coefficient of static friction according to ASTM D-2047. A resin sheet having a coefficient of static friction of not less than 0.5 has a resistance to slip requisite to flooring materials. The transmittance was measured according to JIS K 7105.

EXAMPLE 2–5

Short glass fibers were used in an amount as shown in Table 1 per 100 parts by weight of polyvinyl chloride and otherwise in the same manner as in Example 1, resin sheets having a thickness of 200 μm were prepared. The resistance to scratch, wear and slip of the sheets as well as the transmittance are shown in Table 1.

COMPARATIVE EXAMPLE 1

Except that short glass fibers were not used, a resin sheet having a thickness of 200 μm was prepared in the same manner as in Example 1. The sheet was found to have an embossed and matted surface whose roughness was 4.0 μm and the back side of which roughness was 8.3 μm. The embossed surface and the back side was found to have substantially the same surface roughness as the embossing roll and the backup roll, respectively. The resistance to scratch, wear and slip of the sheets as well as the transmittance are shown in Table 1.

TABLE 1

|  | Examples | | | | | Comparative |
| --- | --- | --- | --- | --- | --- | --- |
|  | 1 | 2 | 3 | 4 | 5 | 1 |
| Content of short glass fibers in resin sheet (parts by weight)*) | 3.0 | 5.0 | 10.0 | 20.0 | 30.0 | 0 |
| Average length of short glass fibers in resin sheet (mm) | 0.51 | 0.60 | 0.58 | 0.61 | 0.55 | — |
| Surface roughness of embossed surface of resin sheet (μm) | 19.5 | 20.0 | 18.5 | 18.5 | 18.0 | 4.0 |
| Resistance to scratch | H ~ 2H | 2H | 2H ~ 3H | 2H ~ 3H | 3H | 2B |
| Resistance to wear | Good after 13000 revolutions | Good after 15000 revolutions | Good after 13000 revolutions | Good after 15000 revolutions | Good after 13000 revolutions | Worn out after 10000 revolutions |
| Resistance to slip | not less than 0.5 | not less than 0.5 | not less than 0.5 | not less than 0.5 | not less than 0.5 | 0.2 |
| Transmittance (%) | 85 | 84 | 84 | 83 | 78 | 90 |

*)Per 100 parts by weight of polyvinyl chloride

What is claimed is:

1. A method for producing a polyvinyl chloride resin sheet having a thickness of 50–500 μm; an embossed and matted surface whose roughness is 15–25 μm; the sheet further comprising short glass fibers having a diameter of 6–12 μm and an average length of 0.2–1.0 mm in an amount of 0.5–30 parts by weight per 100 parts by weight of polyvinyl chloride; and a transmittance of not less than 75%, the method comprising:
    preparing a composition comprising
        (a) polyvinyl chloride;
        (b) a plasticizer in an amount of 5–35 parts by weight per 100 parts by weight of polyvinyl chloride; and
        (c) short glass fibers having a diameter of 6–12 μm and an average length of 2–12 mm in an amount of 0.5–30 parts by weight per 100 parts by weight of polyvinyl chloride;
    calendering the composition into a calendered resin sheet with calender rolls; and then embossing the surface of the calendered resin sheet with an embossing machine having an embossing roll whose surface roughness is in a range of from 3 μm to 6 μm and a backup roll, with a ratio of a peripheral velocity of the embossing roll to a peripheral velocity of a final roll of the calender rolls being in a range of 1.3–2.3 and with the peripheral velocity of the final roll being in a range of 10–25 m per minute, whereby the polyvinyl chloride resin sheet having the surface roughness of 15–25 μm is obtained, wherein the surface roughness is expressed in terms of ten point average roughness.

2. The method as claimed in claim 1 wherein the ratio of the peripheral velocity of the embossing roll to the peripheral velocity of the final roll of the calender rolls is in the range of from 1.5 to 2.1.

3. The method as claimed in claim 1 wherein the short glass fibers are used in an amount of 1–25 parts by weight per 100 parts by weight of polyvinyl chloride.

4. The method as claimed in claim 1 wherein the short glass fibers are used in an amount of 3–20 parts by weight per 100 parts by weight of polyvinyl chloride to provide a resin sheet having a transmittance of not less than 80%.

5. The method as claimed in claim 1 wherein the polyvinyl chloride resin sheet has a coefficient of static friction as defined in ASTM D 2047 of not less than 0.5.

* * * * *